US005604733A

United States Patent [19]
Hargrave

[11] Patent Number: 5,604,733
[45] Date of Patent: Feb. 18, 1997

[54] DYNAMIC TIME SLOT ALIGNMENT IN A DIGITAL RADIO COMMUNICATION SYSTEM

[75] Inventor: Phillip C. Hargrave, Palatine, Ill.

[73] Assignee: Motorola, Inc., Schaumburg, Ill.

[21] Appl. No.: 518,089

[22] Filed: Aug. 22, 1995

[51] Int. Cl.$^6$ ...................................................... H04J 3/16
[52] U.S. Cl. ......................... 370/337; 370/350; 455/56.1; 455/12.1
[58] Field of Search ........................... 370/18, 68.1, 95.1, 370/110.1, 95.2, 95.3, 97, 58.1, 108, 13, 77, 85.7, 100.1, 104.1, 109, 17, 94.2, 29, 94.1, 60, 60.1, 71, 85.8, 102, 105, 105.1; 340/991, 992, 993, 825.69, 825.49, 825.02, 825.03, 825.08, 825; 379/58–62; 375/200, 356, 330, 344, 355, 218, 354, 359; 455/54.1, 46, 62, 63, 67.1, 12.1, 13.1, 13.2, 13.3, 33.1, 53.1, 56.1, 67.3, 67.6, 52.1, 3.2, 4.2, 4.1, 51.1, 31.1, 54.2, 51.2, 7, 50.1, 49.1; 342/457, 354, 357

[56] References Cited

U.S. PATENT DOCUMENTS

| | | | |
|---|---|---|---|
| 5,226,045 | 7/1993 | Chuang | 370/95.3 |
| 5,335,357 | 8/1994 | Fennell et al. | 455/51.2 |
| 5,361,258 | 11/1994 | Arnold et al. | 370/95.3 |
| 5,485,632 | 1/1996 | Ng et al. | 455/51.2 |

*Primary Examiner*—Douglas W. Olms
*Assistant Examiner*—Dang Ton
*Attorney, Agent, or Firm*—James A. Coffing; George C. Pappas

[57] ABSTRACT

Time division multiplex (TDM) radio communication systems require a method of providing communication service to a plurality of subscribers throughout a coverage area. This coverage area typically includes a central resource allocator and a plurality of satellite receivers throughout the coverage area. The method includes the step of, upon receipt of a transmission from a subscriber, transmitting to the central resource allocator an arrival time for the transmission. The central resource allocator then selects, based at least in part on the arrival time, a favorable satellite receiver for facilitating subsequent transmissions from that subscriber.

13 Claims, 3 Drawing Sheets

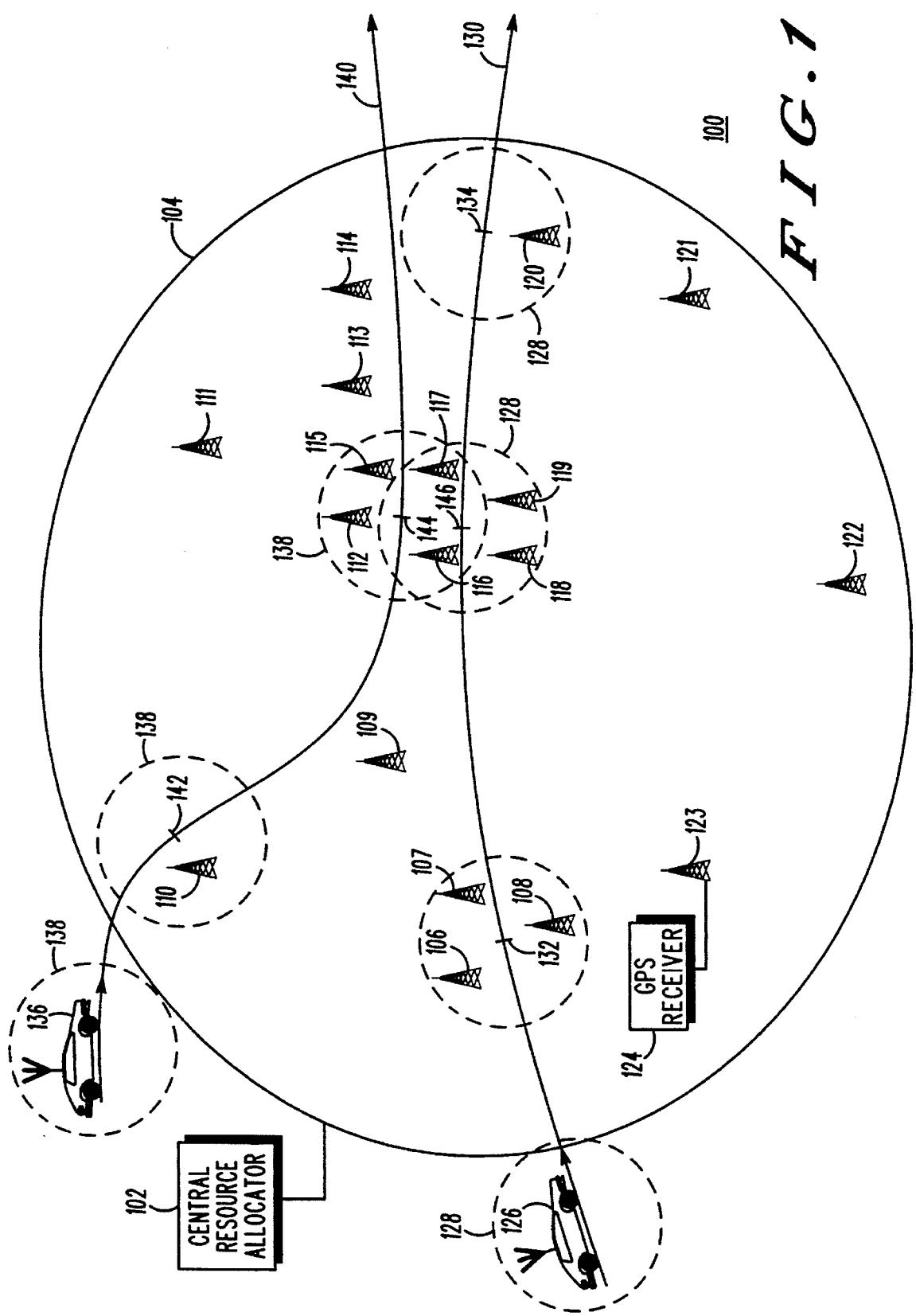

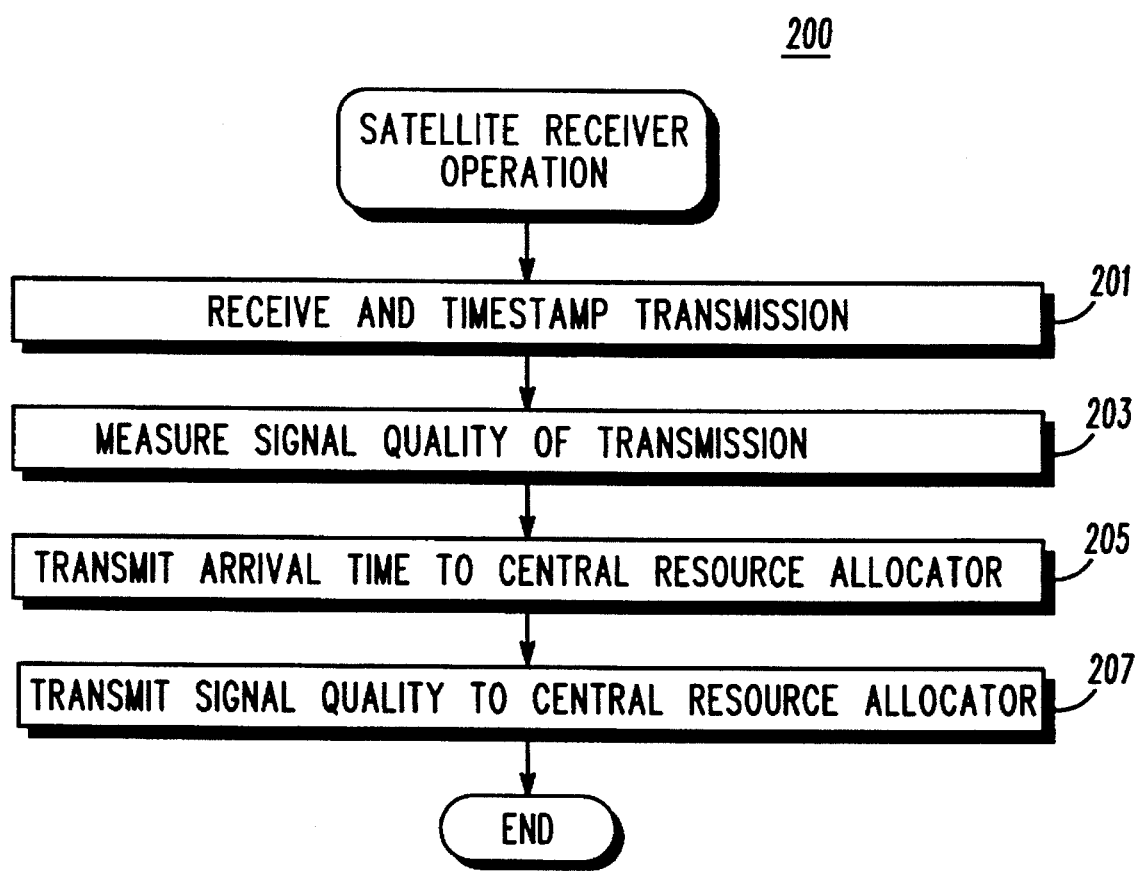

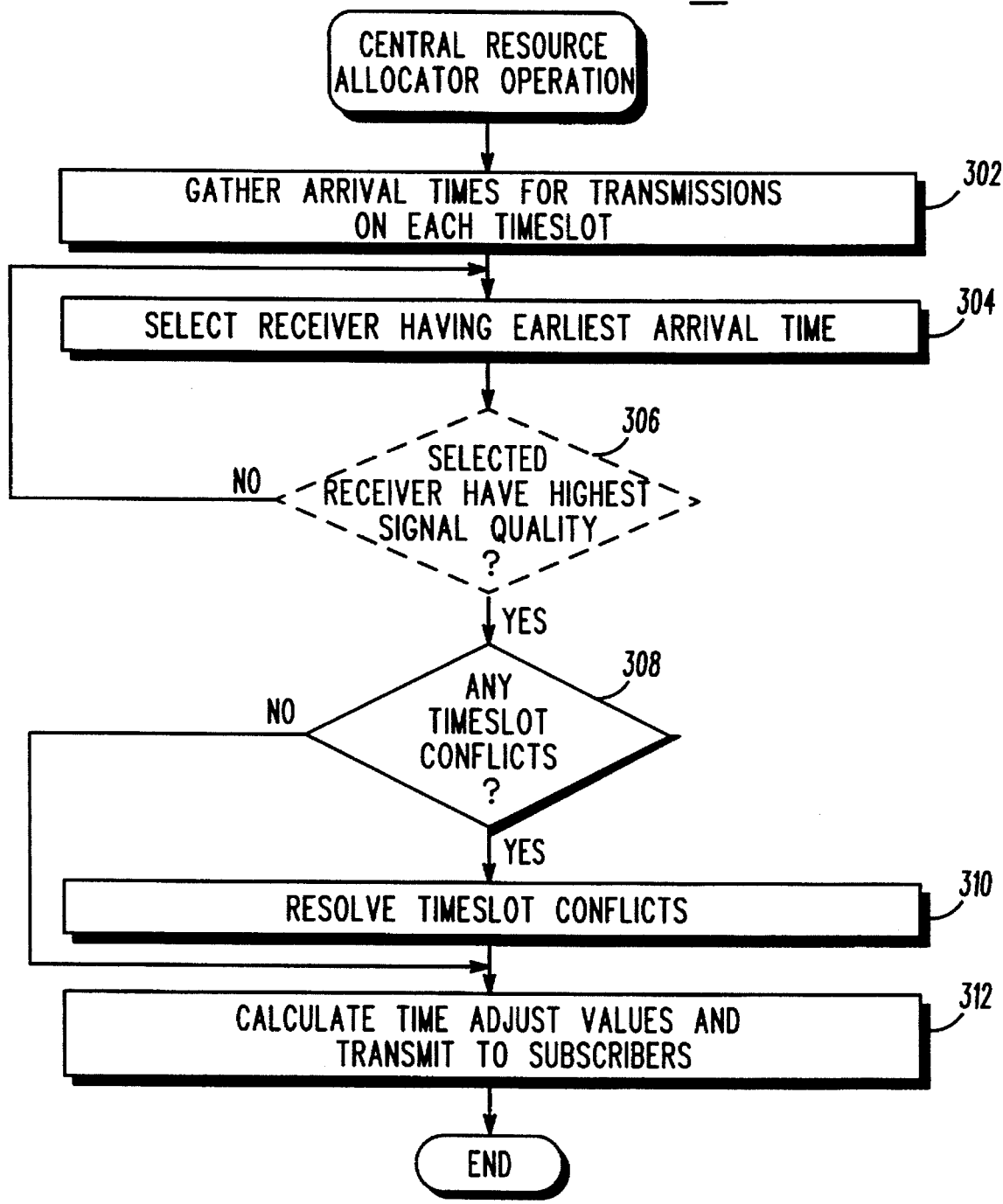

5,604,733

DYNAMIC TIME SLOT ALIGNMENT IN A DIGITAL RADIO COMMUNICATION SYSTEM

FIELD OF THE INVENTION

The present invention relates generally to digital radio communication systems, and more particularly to a method of dynamically aligning time slots within such a communication system.

BACKGROUND OF THE INVENTION

Wide area radio communication systems are known to include a plurality of local coverage areas that are linked to provide wide area coverage. Subscriber units, which include mobile radios, such as Spectra mobile, and portable radios such as Saber Portable. As these subscriber units roam throughout the wide coverage area, and eventually from one local coverage area to another, ongoing calls must be handed over from one local system to another. The local coverage area is limited by the subscriber output power level. This limitation is commonly referred to in the art as talk-in range. By contrast, fixed base stations are placed on high towers and typically generate relatively large output power levels, as compared with the subscriber units. This disparity between the so-called talk-out range and talk-in range presents problems to the system designer. That is, the overall system coverage is inherently limited by the subscriber, which results in a substantial under-utilization of the functionality of the base stations.

In time division multiplexed (TDM) based radio frequency (RF) communication systems, there is another limitation to system coverage. As a subscriber moves away from the fixed base station, the so-called round trip delay (i.e., from the subscriber to the station and back again) increases. This increased delay causes the subscriber to migrate (in time) toward another subscriber's allocated time slot. Thus, the width of the time slot can be a significant factor in limiting system coverage in a TDM-based RF communication system.

Accordingly, there exists a need for a wide area TDM radio communication system that is not constrained by the shortcomings of the prior art. In particular, such a system that does not require an undue proliferation of costly and complex base stations throughout the wide coverage area would be an improvement over the prior art. Moreover, a system that accounted for conflicts created among subscribers vying for communication resources throughout the system would be a further improvement over the art.

BRIEF DESCRIPTION OF THE DRAWINGS

FIG. 1 shows a graphical representation of a wide area coverage system, in accordance with the present invention;

FIG. 2 shows a flow diagram depicting operation of the satellite receivers shown in FIG. 1; and FIG. 3 shows a flow diagram depicting operation of the central resource allocator shown in FIG. 1.

DETAILED DESCRIPTION OF THE PREFERRED EMBODIMENT

The present invention encompasses a method of providing communication service to a plurality of subscribers throughout a wide area time division multiplex (TDM) radio communication system. Communication service is provided to the coverage area by a central resource allocator that is coupled to a plurality of satellite receivers disposed throughout the coverage area. According to the invention, upon receipt of a transmission from one of the plurality of subscribers, those satellite receivers receiving that transmission transmit the arrival time of same to the central resource allocator. The central resource allocator then selects a favorable receiver, based at least in part on the arrival time, to facilitate subsequent transmissions for that transmitting subscriber. In the foregoing manner, the present invention provides a cost effective solution to the problem of providing wide area communication service in a TDM environment.

The present invention can be better understood with reference to FIGS. 1–3. FIG. 1 shows a graphical representation of a wide area communication system 100, in accordance with the present invention. A central resource allocator 102 provides communication service to a coverage area 104. Throughout the coverage area 104, there are provided a plurality of satellite receivers 106–123. (It should be noted that there are other satellite receivers in coverage area 104 that are not shown here for brevity. These receivers are distributed evenly throughout coverage area 104 where there are no obstructions and more densely in urban areas where the path between a subscriber and any single receiver is likely to be obstructed).

A GPS receiver 124 is co-located with each satellite receiver 106–123 in coverage area 104 (though only the one co-located with satellite receiver 123 is shown). The GPS receiver 124 is utilized by the satellite receivers 106–123 in determining the exact arrival time of a transmission, which time is sent to the central resource allocator 102 along with a copy of the transmission itself, as later described.

According to the invention, a first subscriber 126, having a talk-in range shown graphically by area 128, traverses through the wide area communication coverage area 104 via a path 130. While in the coverage area 104, outbound transmissions from the subscriber 126 are facilitated by the satellite receivers—i.e., sent to the central resource allocator for voting and further routing, as later described. It is noted that the system 100 is arranged so that a subscriber is within range of at least one, and more likely several, of the satellite receivers 106–123 at the same time. By way of example, when the subscriber 126 reaches a location 132 on path 130, outbound transmissions can be detected by satellite receivers 106–108, as later described with reference to FIG. 2. Similarly, at location 134 near the boundary of coverage area 104, only satellite receiver 120 facilitates transmissions from the subscriber 126.

In a similar manner, subscriber unit 136, having a talk-in range shown by area 138, traverses through coverage area 104 along path 140. As discussed with reference to subscriber 126, satellite receivers substantially the path 140 facilitate transmissions from subscriber unit 136. For example, when at location 142, satellite receiver 110 facilitates transmissions from subscriber 136. As illustrated, subscribers 136 and 126 can be relatively close together at certain points along paths 140 and 130, such as at locations 144 and 146, respectively. When subscribers 126 and 136 concurrently use the system at these locations, a problem arises that is commonly referred to as contention. That is, when subscriber 136 is transmitting from location 144 while subscriber 126 is simultaneously transmitting from location 146, the two subscribers contend for TDM time slots at satellite receivers 116 and 117 (as these satellite receivers are within talk-in ranges 128 and 138). The present invention permits the central resource allocator to assign time slots to each subscriber, which assignment minimizes the instances that both subscribers are transmitting at the same time while utilizing the same satellite receiver.

FIG. 2 shows a flow diagram (200) depicting the operation of the satellite receivers 106–123, in accordance with the present invention. Upon receipt of an inbound message from a transmitting subscriber, the satellite receiver time stamps (201) the transmissions received in each time slot. This time stamping is accomplished using well known techniques and the GPS receiver co-located with each satellite receiver and constitutes the arrival time. A signal quality metric (e.g., RSSI) for each of these transmissions is measured (203) and optionally used in the voting process, as later described.

As described earlier, the satellite receivers can each be accessed through multiple time slots. The temporal boundaries of these time slots are kept substantially identical by the GPS receivers located at each satellite receiver site. Generally, the arrival time of a subscriber's transmission at a satellite receiver depends on the physical separation between that satellite receiver and the transmitting subscriber. That is, the same transmission is received by two satellite receivers at different times, which times are then transmitted (205) to the central resource allocator. The measured signal quality is also transmitted (207) to the central resource allocator, and the routine is exited.

In the foregoing manner, the satellite receivers provide the requisite information to the central resource allocator for use in determining which among them is the most favorable satellite to handle subsequent transmissions from that subscriber. When the central resource allocator receives all of the copies of the subscribers transmission, it selects which of the satellite receivers would best serve the transmitting subscriber, as next described. The central resource allocator then sends a time adjustment command, later described, to the transmitting subscriber to make its transmissions align with a time slot at the selected receiver. That is, after selection and alignment, subsequent transmissions from the transmitting subscriber are received earlier and with the best available signal quality.

FIG. 3 shows a flow diagram (300) depicting operation of the central resource allocator, in accordance with the present invention. In a preferred embodiment, arrival times are gathered (302) for transmission on each time slot. In addition to arrival times, the resource allocator receives the transmitting subscriber's unit ID and a frame number for each frame arriving at the receiver. Because the frame number is sourced by the transmitting subscriber, it can be used to differentiate between two subscribers transmitting at the same time. Using this information, the resource allocator can differentiate between very late arrival of the same subscriber signal at a particular satellite receiver and a separate subscriber's transmission arriving close in time at the same satellite receiver. The satellite receiver having the earliest arrival time (i.e., as determined using the time stamps described above) is then selected (304) as being a favorable receiver for facilitating subsequent transmissions from that subscriber.

Optionally, the signal quality for each of the time stamped transmissions are also compared (306) and selection of the favorable receiver is made based on the earliest arriving, highest quality transmission. In this manner, the present invention provides an arbitration scheme that consistently selects the receiver that will result in the highest quality for subsequent transmissions.

It is noted that for each transmission, the transmitting subscriber is associated with a plurality of candidate receivers by the resource allocator. For the group of candidate receivers held in common, the resource allocator identifies the time slot/receiver combinations that would cause the two subscribers to be in the same time slot at the selected receiver for one of the subscribers. This is done through identification of favorable time slots based on present usage of time slots and receivers.

Conflicts arising when two subscribers in the same general area are using the system at the same time, as earlier described with reference to FIG. 1, are identified (308) and resolved (310) as follows. Conflict resolution can occur whenever a subscriber vies for a time slot/receiver pair already in use. Resolution of the conflict is accomplished by comparing the needs of the transmitting subscriber with the present static allocation of time slots and receivers. The transmitting subscriber is assigned a new, more favorable time slot/receiver combination such that: 1) a high quality copy of the transmission is present at the receiver; and assignment of an unused time slot at that receiver will not interfere with another subscriber in an adjacent time slot. The highest probability for the intersection of these two requirements will usually lie in the closest receiver to the subscriber, which will be the receiver that yields the earliest arrival time indication.

Time adjust values are then calculated (312) and transmitted to the subscriber(s). It should be noted that the time adjust values, in a preferred embodiment, are simply the difference between the arrival time of the transmission at the selected receiver and a predetermined position within the time slot. In a preferred embodiment, the resource allocator would choose an alignment value that would guarantee subsequent transmissions substantially in the center of a time slot. However, in times of heavy system utilization the resource allocator might preferably align the transmissions to one edge of the time slot (i.e., near one time slot boundary) to avoid another subscriber whose transmissions are already close to the opposite time slot boundary. While such a deployment scheme might increase the number of errors in the subscribers received signal, it would serve to allow a greater number of simultaneous conversations on the system.

In the foregoing manner, the present invention solves the problem of the prior art by cost effectively increasing the talk-in range for subscribers through the use of less complex satellite receivers. Furthermore, arbitrating among these satellite receivers to produce a more favorable transmission signal quality, and aligning the transmissions within the newly assigned time slot within a TDM environment, is an improvement over the prior art.

What is claimed is:

1. In a time division multiplex (TDM) radio communication system, a method of providing communication service to a plurality of subscribers throughout a coverage area, the coverage area including a central resource allocator, the method comprising the steps of:

providing a plurality of satellite receivers throughout the coverage area;

at at least one of the plurality of satellite receivers;
upon receipt of a transmission from a transmitting one of the plurality of subscribers, transmitting to the central resource allocator an arrival time for the transmission; and at the central resource allocator;
selecting, based at least in part on the arrival time, a favorable one of the plurality of satellite receivers for facilitating subsequent transmissions from the transmitting subscriber.

2. The method of claim 1, further comprising the step of, at the central resource allocator:

performing time slot alignment on the subsequent transmissions to facilitate arrival of the subsequent transmissions at the favorable receiver within a predetermined time slot.

3. The method of claim 2, wherein the step of performing comprises the step of transmitting a time adjust value to facilitate arrival of the subsequent transmissions at the favorable satellite receiver at a predetermined position within the predetermined time slot.

4. The method of claim 3, wherein the step of transmitting comprises the step of transmitting the time adjust value that advances the subsequent transmissions substantially toward a favorable edge of the predetermined time slot.

5. The method of claim 3, wherein the step of transmitting comprises the step of transmitting the time adjust value that advances the subsequent transmissions substantially toward a center of the predetermined time slot.

6. The method of claim 1, wherein the step of selecting a favorable receiver comprises the steps of:

at the central resource allocator;
identifying a plurality of candidate receivers;
identifying a favorable time slot, based at least in part on present usage of time slots at each of the identified plurality of candidate receivers; and
assigning, to the transmitting subscriber, the favorable time slot for use in transmitting the subsequent transmissions.

7. The method of claim 6, further comprising the step of, at the central resource allocator:

performing time slot alignment on the subsequent transmissions within time slot boundaries of the favorable time slot.

8. The method of claim 1, further comprising the steps of:

at the at least one of the plurality of satellite receivers;
upon receipt of the transmission, transmitting to the central resource allocator a signal quality metric for the transmission; and
at the central resource allocator;
using the signal quality metric to identify a plurality of candidate receivers from which the favorable receiver is selected.

9. In a time division multiplex (TDM) radio communication system, a method of providing communication service to a plurality of subscribers throughout a coverage area, the coverage area including a central resource allocator, the method comprising the steps of:

providing a plurality of satellite receivers throughout the coverage area;

at at least two of the plurality of satellite receivers;
upon receipt of a transmission from a transmitting one of the plurality of subscribers, transmitting to the central resource allocator an arrival time for the transmission;
at the central resource allocator;
selecting, based at least in part on the at least two arrival times, a favorable receiver for facilitating subsequent transmissions from the transmitting subscriber; and
performing time slot alignment on the subsequent transmissions to facilitate arrival of the subsequent transmissions at the favorable receiver within a predetermined time slot.

10. The method of claim 9, wherein the step of performing comprises the step of transmitting, to the transmitting subscriber, a time adjust value that advances the subsequent transmissions substantially toward a favorable edge of the predetermined time slot.

11. The method of claim 9, wherein the step of performing comprises the step of transmitting a time adjust value that advances the subsequent transmissions substantially toward a center of the predetermined time slot.

12. The method of claim 9, wherein the step of selecting a favorable receiver comprises the steps of:

at the central resource allocator;
identifying a plurality of candidate receivers;
identifying a favorable time slot, based at least in part on present usage of time slots at each of the identified plurality of candidate receivers;
assigning, to the transmitting subscriber, the favorable time slot for use in transmitting the subsequent transmissions; and
performing time slot alignment on the subsequent transmissions within time slot boundaries of the favorable time slot.

13. The method of claim 9, further comprising the steps of:

at the at least two of the plurality of satellite receivers;
upon receipt of the transmission, transmitting to the central resource allocator a signal quality metric for the transmission; and
at the central resource allocator;
using the signal quality metric to identify a plurality of candidate receivers from which the favorable receiver is selected.

* * * * *